US010933588B2

(12) United States Patent
Adzima

(10) Patent No.: US 10,933,588 B2
(45) Date of Patent: Mar. 2, 2021

(54) STEREOLITHOGRAPHY PRINTER

(71) Applicant: Autodesk, Inc., San Rafael, CA (US)

(72) Inventor: Brian James Adzima, San Francisco, CA (US)

(73) Assignee: Autodesk, Inc., San Rafael, CA (US)

(*) Notice: Subject to any disclaimer, the term of this patent is extended or adjusted under 35 U.S.C. 154(b) by 547 days.

(21) Appl. No.: 15/816,417

(22) Filed: Nov. 17, 2017

(65) Prior Publication Data

US 2018/0141278 A1 May 24, 2018

Related U.S. Application Data

(60) Provisional application No. 62/423,941, filed on Nov. 18, 2016.

(51) Int. Cl.
*B29C 64/393* (2017.01)
*B29C 64/135* (2017.01)
(Continued)

(52) U.S. Cl.
CPC .......... *B29C 64/393* (2017.08); *B29C 64/129* (2017.08); *B29C 64/135* (2017.08);
(Continued)

(58) Field of Classification Search
CPC ... B29C 64/124; B29C 64/129; B29C 64/135; B29C 64/386; B29C 64/393
See application file for complete search history.

(56) References Cited

U.S. PATENT DOCUMENTS 8,633,939 B2 * 1/2014 Schrag .................... G06T 19/00
345/582
8,666,142 B2 * 3/2014 Shkolnik ............... B29C 64/393
382/154
(Continued)

FOREIGN PATENT DOCUMENTS

EP           0860267 B1 * 11/2001  .......... B29C 64/386
WO     WO-0151993 A1 *  7/2001  .............. G03F 7/705
WO  WO-2011098609 A1 *  8/2011  .............. B42D 25/29

OTHER PUBLICATIONS

Paul F. Jacobs, et al., "Rapid Prototyping & Manufacturing: Fundamentals of SteroLithography", Society of Manufacturing Engineers, Jan. 1992, pp. 87-97.

*Primary Examiner* — Atul P. Khare
(74) *Attorney, Agent, or Firm* — Fish & Richardson P.C.

(57) ABSTRACT

Techniques and systems for 3D printing with machines having imperfect light projection are described. A technique includes receiving an intensity map comprising a plurality of pixel values, wherein the pixel values of the intensity map represent variations in intensity of light projection of an additive-manufacturing apparatus; receiving cross-sectional images of a three dimensional (3D) model of an object, each cross-sectional image comprising a plurality of pixel values, each pixel value of each cross-sectional image having an X-location and a Y-location; for each cross-sectional image of the 3D model, applying pixel values of the intensity map to corresponding pixel values of the cross-sectional image of the 3D model, to make one of a plurality of additive-manufacturing images that are calibrated to account for the variations in intensity of the light projection; and providing the additive-manufacturing images to the additive-manufacturing apparatus to build the object.

19 Claims, 5 Drawing Sheets

(51) Int. Cl.
*B33Y 10/00* (2015.01)
*B33Y 50/02* (2015.01)
*B33Y 30/00* (2015.01)
*B33Y 50/00* (2015.01)
*B29C 64/386* (2017.01)
*B29C 64/129* (2017.01)
*G06T 15/10* (2011.01)

(52) U.S. Cl.
CPC ............ *B29C 64/386* (2017.08); *B33Y 10/00* (2014.12); *B33Y 30/00* (2014.12); *B33Y 50/00* (2014.12); *B33Y 50/02* (2014.12); *G06T 15/10* (2013.01); *G06T 2215/16* (2013.01)

(56) References Cited

U.S. PATENT DOCUMENTS

| | | | |
|---|---|---|---|
| 9,367,049 B2 * | 6/2016 | Jariwala | B29C 64/135 |
| 10,232,553 B2 * | 3/2019 | Joyce | B29C 64/393 |
| 10,647,055 B2 * | 5/2020 | Wynne | B29C 64/124 |
| 2015/0137426 A1 * | 5/2015 | Van Esbroeck | B33Y 30/00 |
| | | | 264/401 |
| 2015/0174658 A1 * | 6/2015 | Ljungblad | B29C 64/153 |
| | | | 419/55 |

* cited by examiner

STEREOLITHOGRAPHY PRINTER

CROSS-REFERENCE TO RELATED APPLICATION

This application claims priority to U.S. Provisional Application No. 62/423,941, filed on Nov. 18, 2016. The disclosure of the prior application is considered part of and is incorporated by reference in the disclosure of this application.

BACKGROUND

This specification relates to three-dimensional (3D) printing.

Photopolymer-based 3D printers that use bottom-up illumination can project light upwards through an optically transparent window into a vat of photo-reactive resin to cure at least a portion of the resin. Such printers can build a 3D structure by forming one layer at a time, where a subsequent layer adheres to the previous layer. The light can be patterned to cause some portions of the resin to cure and other portions not to cure, thereby creating substructures of the 3D structure.

SUMMARY

This specification describes technologies relating to 3D printing with machines having imperfect light projection. In one aspect, a described technique includes receiving an intensity map comprising a plurality of pixel values, each pixel value of the intensity map having an X-location and a Y-location, wherein the pixel values of the intensity map represent variations in intensity of light projection of an additive-manufacturing apparatus; receiving cross-sectional images of a three dimensional (3D) model of an object, each cross-sectional image comprising a plurality of pixel values, each pixel value of each cross-sectional image having an X-location and a Y-location; for each cross-sectional image of the 3D model, applying pixel values of the intensity map to corresponding pixel values of the cross-sectional image of the 3D model having the same X-locations and Y-locations, to make one of a plurality of additive-manufacturing images that are calibrated to account for the variations in intensity of the light projection; and providing the additive-manufacturing images to the additive-manufacturing apparatus to build the object. Other implementations can include corresponding system, apparatus, and computer program products.

These and other implementations can include one or more of the following features. The additive-manufacturing apparatus is a photo polymerization 3D printer, and the providing comprises directing the photo polymerization 3D printer to build the object by projecting the additive-manufacturing images into a resin. Each of the light projections of the photo polymerization 3D printer has an X-location and a Y-location, and each of the pixel values of the intensity map represent an intensity of one and only one light projection having the same X-locations and Y-locations. Implementations can include receiving a plurality of calibration measures, each calibration measure having an X-location and a Y-location and representing a solidification-depth of corresponding light projections of the additive-manufacturing apparatus having the same X-locations and Y-locations, wherein there are fewer calibration measures than there are light projections; and generating a corresponding pixel value of the intensity map for each light projection having the same X-location and Y-location by performing a regression analysis using the calibration measures as constraints. Implementations can include receiving a calibration object printed by the additive-manufacturing apparatus, the calibration object comprising a plurality of measurement points; and measuring a height of each measurement point to generate the plurality of calibration measures. Implementations can include printing, by the additive-manufacturing apparatus, the calibration object, wherein variations in intensity of light projection of the additive-manufacturing apparatus cause measurement points of the calibration object to have variations in height. Implementations can include applying pixel values of the intensity map to corresponding pixel values of an image of a calibration object to make a validation additive-manufacturing image; and validating the intensity map of the additive-manufacturing apparatus by determining that height measures of a validation object printed by the additive-manufacturing apparatus using the validating additive-manufacturing image are within a threshold range. Implementations can include printing, by the additive-manufacturing apparatus, the validation object using the validating additive-manufacturing image. Implementations can include measuring the validation object to generate the height measures.

These and other implementations can include one or more of the following features. The additive-manufacturing apparatus and the data processor are integrated into a single device. The additive-manufacturing apparatus is a photo polymerization 3D printer. Each of the light projections of the photo polymerization 3D printer has an X-location and a Y-location, and each of the pixel values of the intensity map are proportional to an intensity of one and only one light projection having the same X-locations and Y-locations. The data processor is configured to: receive a plurality of calibration measures, each calibration measure having an X-location and a Y-location and representing a solidification-depth of corresponding light projections of the additive-manufacturing apparatus having the same X-locations and Y-locations, wherein there are fewer calibration measures than there are light projections; and generate a corresponding pixel value of the intensity map for each light projection having the same X-location and Y-location by performing a regression analysis using the calibration measures as constraints. The data processor is configured to: generate a plurality of height measures based on heights of measurement points of a calibration object printed by the additive-manufacturing apparatus. The additive-manufacturing apparatus is configured to: print the calibration object, wherein variations in intensity of light projection of the additive-manufacturing apparatus cause measurement points of the calibration object to have variations in height. The data processor is configured to: apply pixel values of the intensity map to corresponding pixel values of an image of a calibration object to make a validation additive-manufacturing image; and validate the intensity map of the additive-manufacturing apparatus by determining that height measures of a validation object printed by the additive-manufacturing apparatus using the validating additive-manufacturing image are within a threshold range. The additive-manufacturing apparatus is configured to: print the validation object using the validating additive-manufacturing image. The data processor is configured to: receive an indication of validation based on measures of the validation object.

A system for printing an object can include an additive-manufacturing apparatus configured to build an object by selectively projecting light to successive layers of a build media. The system can include a data processor configured to receive an intensity map comprising a plurality of pixel values, each pixel value of the intensity map having an X-location and a Y-location, wherein the pixel values of the intensity map represent variations in intensity of light projection of the additive-manufacturing apparatus; receive cross-sectional images of a three dimensional (3D) model of an object, each cross-sectional image comprising a plurality of pixel values, each pixel value of each cross-sectional image having an X-location and a Y-location; for each cross-sectional image of the 3D model, apply pixel values of the intensity map to corresponding pixel values of the cross-sectional image of the 3D model having the same X-locations and Y-locations, to make one of a plurality of additive-manufacturing images that are calibrated to account for the variations in intensity of the light projection; and provide the additive-manufacturing images to the additive-manufacturing apparatus to build the object.

Particular implementations disclosed herein can provide one or more of the following advantages. A described technology can build an object with an additive-manufacturing apparatus while compensating for variations in intensity of light projection of the additive-manufacturing apparatus. A described technology can modify images to calibrate the images for building with a particular additive-manufacturing apparatus.

Details of one or more implementations are set forth in the accompanying drawings and the description below. Other features and advantages may be apparent from the description and drawings, and from the claims.

DESCRIPTION OF DRAWINGS

Like reference symbols in the various drawings indicate like elements

DETAILED DESCRIPTION

Some additive-manufacturing apparatuses use light energy to cure or melt a print media. The source of this light energy may be designed so that the light energy is projected in a nominally-consistent intensity. That is, the light intensity should be set to some particular value and expected to be of that value. However, real-world constraints and imperfections in the additive-manufacturing apparatus may result in light projections that vary from nominal enough to affect the quality of an object build by the additive-manufacturing apparatus. To compensate for these variations, an intensity map may be used to alter cross-sectional images of an object model so that the images are calibrated to account for the variations in intensity of the light projection. These calibrated images may then be used to build the object, reducing artifacts caused by light variations.

Figure 1:
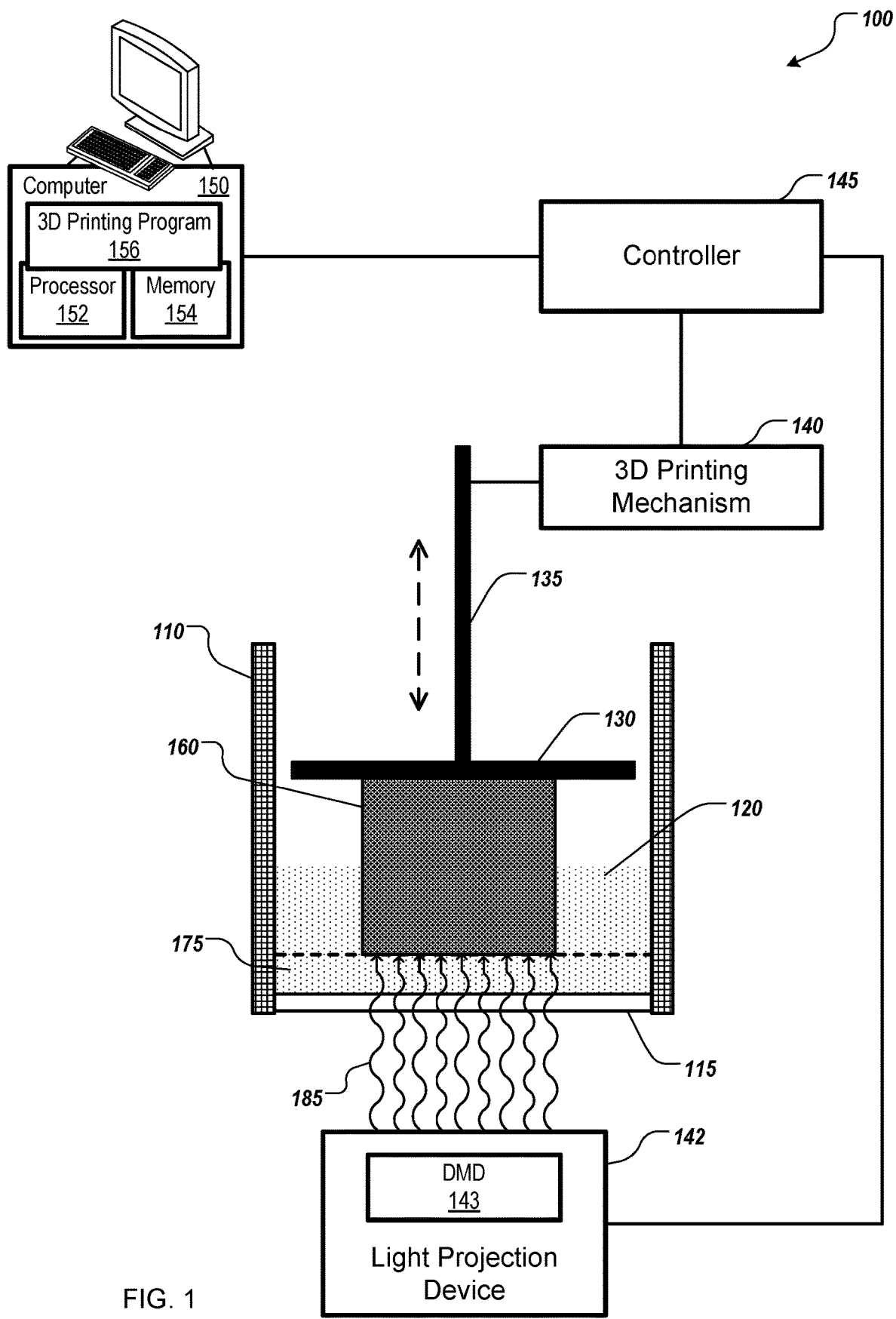
FIG. 1 shows an example of a 3D printing system coupled with a computer.

FIG. 1 shows an example of a 3D printing system 100 coupled with a computer 150. The computer 150 can provide information about a 3D structure to the 3D printing system 100 for printing. The computer 150 can communicate with a controller 145 of the printing system 100 via a wireline or wireless connection. The controller 145 can include integrated circuit technology, such as an integrated circuit board with embedded processor and firmware to control various system components such as a 3D printing mechanism 140 and a light projection device 142.

The system 100 includes a vat 110 to hold a liquid 120, which includes one or more photo-reactive resins. The vat 110 includes a window 115 in its bottom through which light is transmitted to cure resin to form a 3D printed object 160 in a layer-by-layer build process. The 3D printed object 160 is shown as a block, but as will be appreciated, a wide variety of complicated shapes can be 3D printed. The object 160 is 3D printed on a build plate 130, which can be connected by a rod 135 to a 3D printing mechanism 140. The printing mechanism 140 can include various mechanical structures for moving the build plate 130 within the vat 110. This movement is relative movement, and thus the moving piece can be build plate 130, the vat 110, or both, in various implementations.

In some implementations, the window 115 includes a material such as polydimethylsiloxane (PDMS) to prevent resin from adhering to the window 115 during a curing procedure. Other techniques can be used to prevent resin from adhering to the window 115 such as a photo-inhibition technique that prevents resin from curing within a section of the vat 110 immediately above the window 115, while allowing resin to cure further away from the window 115.

The light projection device 142 can be positioned below the window 115. The controller 145 can operate the light projection device 142 to project a pattern of light 185 into the vat 110 to form substructures of the object 160. The light 185 has a wavelength which is used to create the 3D object 160 on the build plate 130 by curing the photo-reactive resin in the liquid 120 within a photo-initiation region 175, in accordance with a defined pattern or patterns. The wavelength can be selected based on the characteristics of the photo-reactive resin in the liquid 120. The build plate 130 can start at a position near the bottom of the vat 110, and varying patterns of the light 185 are directed through the window 115 to create layers of the solid object 160 as the build plate 130 is raised out of the vat 110 by the printing mechanism 140. In some implementations, the printing mechanism 140 can employ a stepwise separation mechanism that raises the build plate 130 by a predetermined amount after each layer completion, e.g., after a predetermined curing time. In some implementations, the printing mechanism 140 can include mechanisms to aid in separation, e.g., by providing a rotation out of the plane of FIG. 1. In some implementations, the printing mechanism 140 can employ a continuous separation mechanism that continuously raises the build plate 130.

The light projection device 142 can be configured to modulate its light projections based on a two dimensional grid of pixels. In some implementations, the light projection device 142 can include a pixel addressable filter to allow controlled amounts of light to pass at some pixel locations while blocking or deflecting light at other pixel locations from a light source within the light projection device 142. A pixel addressable filter can include a digital micromirror device (DMD) 143.

The DMD 143 can include mirrors that each correspond to one of the pixels in the grid of pixels. Each of the mirrors can have an X-value along an X-axis of the DMD 143 and a Y-value along a Y-axis of the DMD 143. The X-values may be denoted as columns and the Y values may be denoted as rows, and successive rows and/or columns may be laterally offset from adjacent rows or columns.

In some implementations, the light projection device 142 can include a pixel addressable light source to produce controlled amounts of light at some pixel locations and not produce light at other pixel locations. In some implementations, the light projection device 142 includes a liquid crystal display (LCD) device, discrete light emitting diode (LED) array device, laser, or a digital light processing (DLP) projector.

In some implementations, the 3D printing system 100 can include sensors and be designed to modify its operations based on feedback from these sensors. For example, the 3D printing system 100 can use closed loop feedback from sensors in the printer to improve print reliability. Such feedback sensors can include one or more strain sensors on the rod 135 holding the build plate 130 to detect if adhesion has occurred and stop and/or adjust the print, and one or more sensors to detect polymer conversion, such as a spectrometer, a pyrometer, etc. These sensors can be used to confirm that the 3D printing is proceeding correctly, to determine if the resin has been fully cured before the 3D printing system 100 proceeds to the next layer, or both. Moreover, in some implementations, one or more cameras can be used along with computer vision techniques to check that the print is proceeding as expected. Such cameras can be positioned under the vat 110 to examine the output, e.g., 3D printed layer, which the controller 145 can compare to the input, e.g., mask or layer image.

The computer 150 can include a processor 152, memory 154, and interfaces such as a network interface or a Universal Serial Bus (USB) interface. The processor 152 can be one or multiple processors, which can each include multiple processor cores. The memory 154 can include volatile memory such as Random Access Memory (RAM). The memory 154 can include non-volatile memory such as flash memory or read-only memory (ROM). The computer 150 can include one or more types of computer storage media and devices, which can include the memory 154, to store instructions of programs that run on the processor 152. For example, a 3D printing program 156 can be stored in the memory 154 and run on the processor 152 to implement the techniques described herein. In some implementations, the controller 145 can include the 3D printing program 156 or a portion thereof.

The 3D printing program 156 can transform a digital model into a sequence of layers that collectively describe the object 160. The 3D printing program 156 can access a file containing mesh data that represents a digital model. Mesh data can include descriptions of geometric shapes such as polygons and their locations within the digital model. The 3D printing program 156 can map the digital model into three-dimensional discrete points called voxels. In some implementations, a voxel can be mapped to a pixel within a layer. In some implementations, the digital model can be sliced into grids of pixels and each pixel represents a voxel.

In other examples, different kinds of additive-manufacturing apparatus may be used. For example, a selective laser sintering (SLS) printer uses a light source such as a laser to sinter print media. This print media may include, for example, metallic powder such as aluminum, iron, or steel. In some printers, the light source is positioned above the print media and light projections are cast downward to the print media. When a layer of the object in such a printer is completed, a print bed may be lowered, and a fresh layer of print media may be added on top of the partially printed object.

Figure 2:
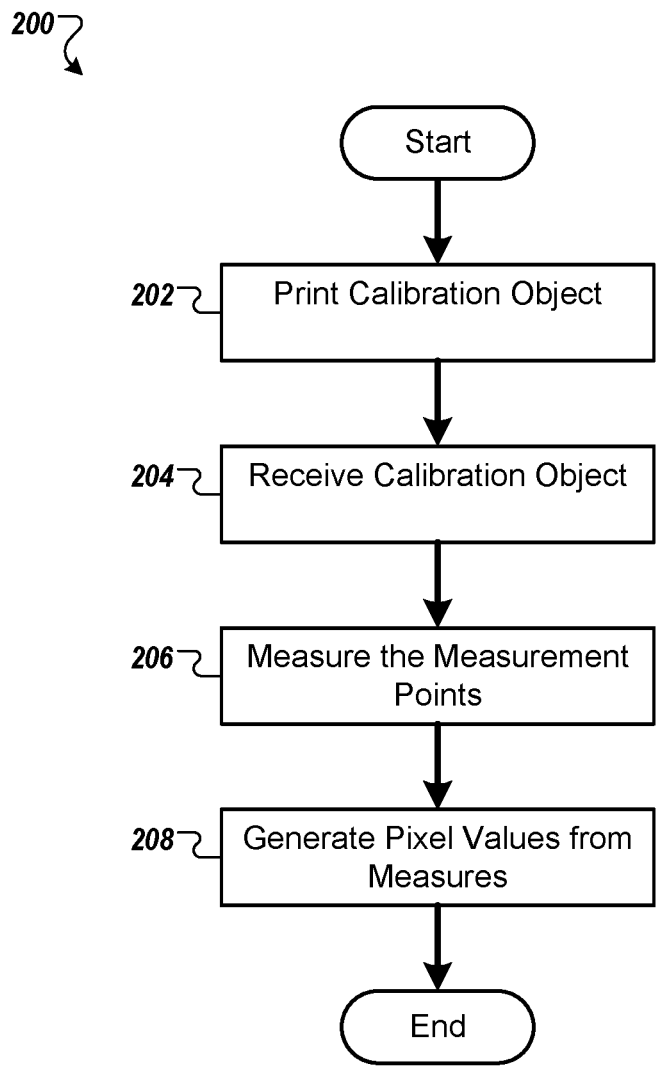
FIG. 2 is a flowchart of an example of a process that generates an intensity map.
Figure 3:
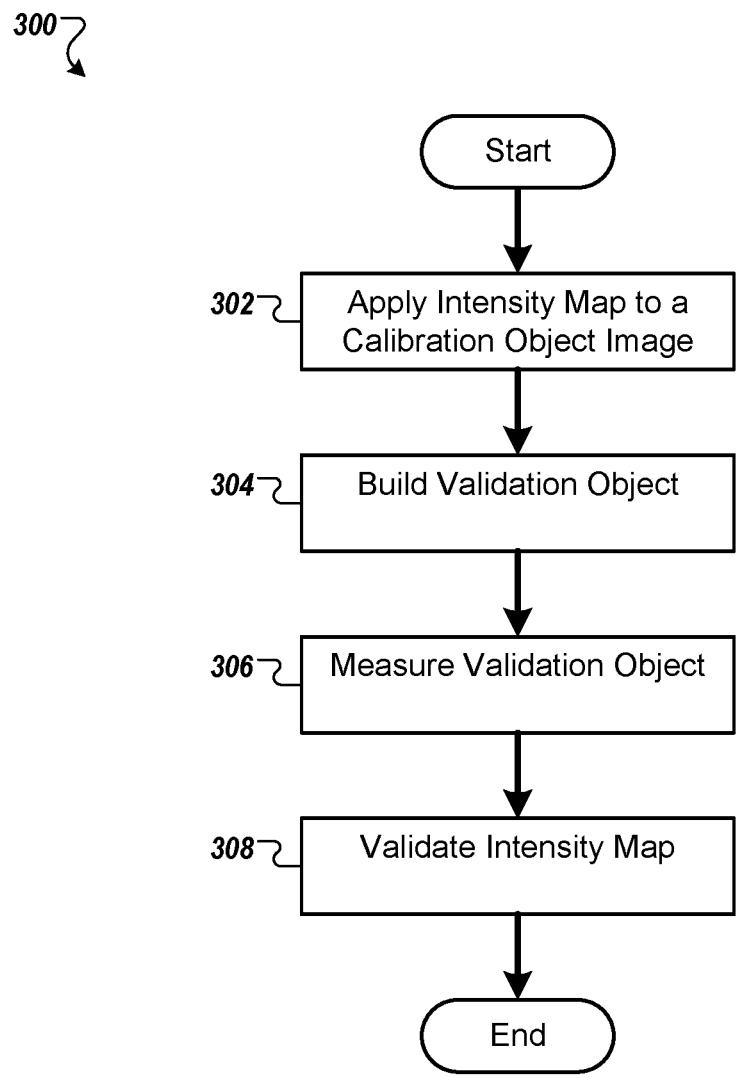
FIG. 3 is a flowchart of an example of a process that validates an intensity map.
Figure 4:
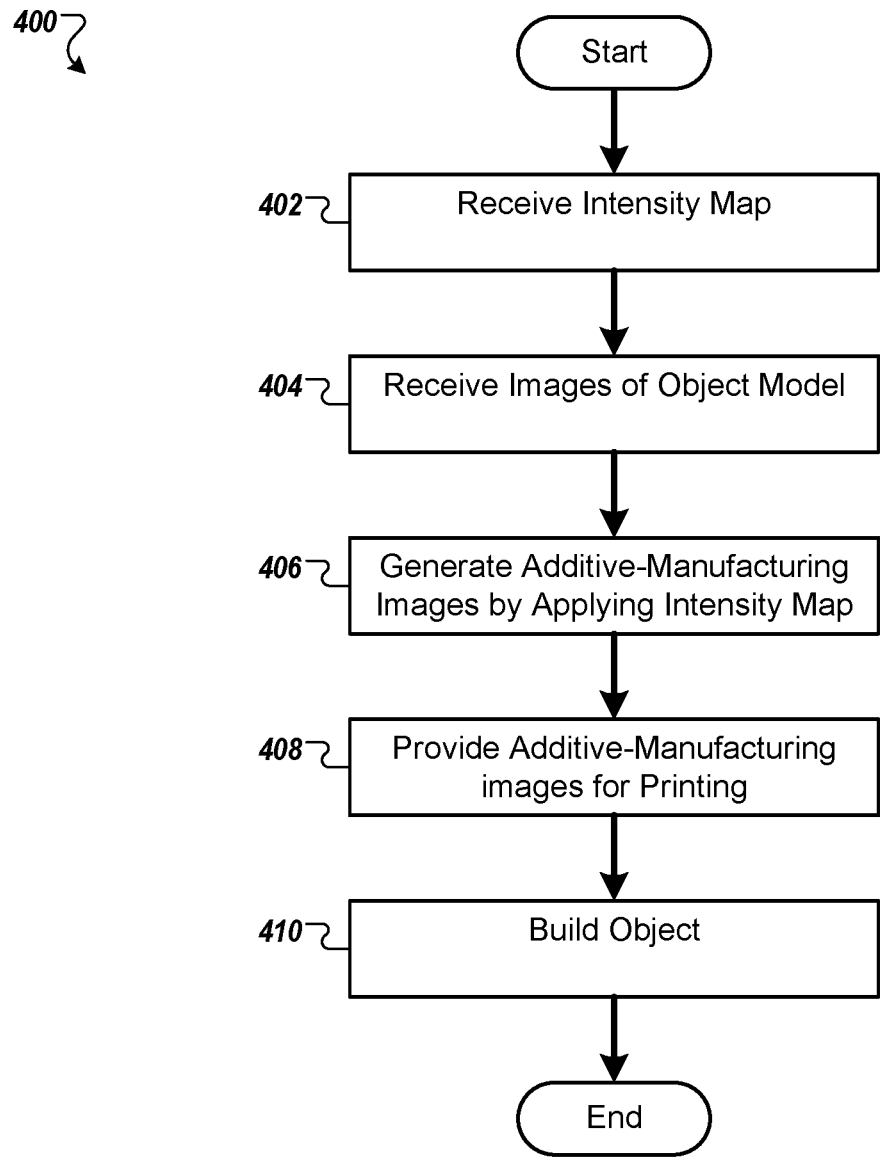
FIG. 4 is a flowchart of an example of a process that builds an object using an intensity map.

FIGS. 2-4 describe processes 200-400 that may be performed with the 3D printing system 100 and other systems. These processes 200-400 may include various levels of manual intervention and automation. In some implementations, some or all of the processes 200-400 may be performed in substantially automated fashion. For example, one or more data processors, material handling robots, and other automated manipulators may be available to transfer data and materials, to initiate builds, to retrieve and clean an object, and to measure an object that is built. In some implementations, human operators may manually perform some or all of these tasks.

The processes 200-400 may be performed by additive-manufacturing apparatuses and data processors that are in data communication with each other, and that have a variety of physical relationships with each other. In some configurations, an additive-manufacturing apparatus and a data processor may be integrated into a single device, and the additive-manufacturing apparatus and a data processor can operate together to perform some or all of the processes 200-400. In some configurations, data processors external to an additive-manufacturing apparatus can operate together to perform some or all of the processes 200-400. For example, a remote server or computer can perform data processing operations and can send data and requests over a data network, by removable computer-readable media, etc.

FIG. 2 is a flowchart of an example of a process 200 that generates an intensity map. The process 200 can be performed by, for example, computing devices, additive-manufacturing apparatuses, and/or human or robotic operators, e.g., using calipers, micrometers, or custom-designed tools. In the process 200, a calibration object is printed by an additive-manufacturing apparatus. Variations in light projections of the additive-manufacturing apparatus can result in variations in height for different parts of the calibration object that are nominally the same height. These height variations can be measured and used for creating an intensity map that represents the variations in light projection. Once created, the intensity map can be used when printing future objects so that the effects of the variations are reduced or eliminated.

A calibration object is printed 202. For example, the 3D printing system 100 can receive a representation of a calibration object to be printed. The representation may be, for example, a 3D mesh, a two dimensional (2D) image, or any other technologically appropriate representation. The 3D printing system 100 can then print the calibration object from the representation. In some implementations, this printing may include printing a single layer using normal printing parameters that can be used for other printing tasks. In some implementations, this printing may include parameters selected specifically for printing a calibration object. For example, the printing of the calibration object may be performed with a longer-than-normal exposure time, resulting in a deeper than normal solidification of the build media.

To accommodate the printing of the calibration object, other special-purpose parameters may be used. For example, the build plate 130 may be backed off so that the light does not penetrate far enough cure resin 120 contacting the build plate 130. This can allow the calibration object to cure to a depth proportional to the intensity of the light projection without being influenced by or attached to the build plate 130.

The calibration object can include a plurality of measurement points. For example, see FIG. 5 and the associated description below. The measurement points can represent locations on the calibration object where a handler may measure the height of the calibration object. For example, for a calibration object having a lattice and circles, each circle may be a measurement point. Variations in intensity of light projection of the additive-manufacturing apparatus can cause measurement points of the calibration object to have variations in height. For example, if the 3D printing system 100 generates light projections of greater intensity in the center of a print area and light projections of lower intensity around the perimeter, the calibration object will have a greater height at measurement points in the center and lesser height at measurement points around the perimeter.

The calibration object is received 204. A height of each measurement point is measured 206 to generate a plurality of calibration measures. For example, one or more operators may retrieve the calibration object from the 3D printing system 100, clean the uncured resin from the calibration object, and measure each of the measurement points. The operators may be human, robotic, or a combination of both. The operator or operators may use general-purpose or custom tools to measure the height of each measurement point. In some examples, a general purpose micrometer may be used to measure a height of each measurement point. In some example, a custom measuring device may be used to measure a height of each measurement point. This custom measuring device may include, for example, a jig configured to hold the calibration object and a bed of contact sensors that are each independently lowered toward the jig until contact is made with a measurement point.

Each calibration measure can have an X-location and a Y-location and represent a solidification-depth of corresponding light projections of the additive-manufacturing apparatus having the same X-locations and Y-locations. In some examples the solidification-depth is a cure-depth, or the depth at which a resin is photo polymerized. In some examples the solidification-depth is a sinter-depth, or the depth at which a powder is sintered. As the calibration object is built by light projections across a two-dimensional area, locations in the calibration object across its surface are solidified by a light projection. Those locations have a height that is caused by the intensity of a light projection at that same location.

There may be fewer calibration measures than there are light projections. For example, the 3D printing system 100 may be configured to print objects at a resolution too fine and/or too high to allow for practical measuring at every light projection. Instead, the calibration object can be designed to have measurement points at a subset of the light projections. By using fewer measurement points than light projections, fewer calibration measures than light projections may be made. In practice, each measurement point is cured by a group of adjacent light projections, but the measurement point may be treated as tied to a particular light projection.

A corresponding pixel value of an intensity map is generated 208 for each light projection having the same X-location and Y-location by performing a regression analysis using the calibration measures as constraints. For example, 3D printing system 100 may receive the calibration measures and generate an intensity map to be stored in the memory 154. In some examples, a human or automated operator can record the heights in a data object such as a spreadsheet, text file, or database. Then, a human or automated agent can generate a model of the intensity map using a regression analysis such as multivariable linear regression via ordinary least squares, a polynomial regression or another regression method. Further discussion of this analysis is found later in this document.

This intensity map can include a plurality of pixel values, each pixel value of the intensity map having an X-location and a Y-location, wherein the pixel values of the intensity map represent variations in intensity of light projection of an additive-manufacturing apparatus. In some examples, if the 3D printing system 100 generates light projections of greater intensity in the center of its print area, and light projections of lower intensity around the perimeter, the intensity map can contain higher values in the center of the intensity map, and lower values around the perimeter. In some examples, a value of 1 may be used to represent a nominal intensity of light projections, with relatively higher or lower numbers representing relatively greater or lesser intensity. In some examples, a value of 0 may be used to represent the greatest intensity, with greater pixel values representing proportionally lower intensities.

In some implementations, each of the pixel values of the intensity map are proportional to an intensity of one and only one light projection having the same X-locations and Y-locations. For example, the intensity map may have the same resolution as the 3D printing system 100, and each pixel of the intensity map may have a one-to-one relationship to a unique light projection.

In some implementations, pixel values can be associated with more than one light projection. In some examples, more than one pixel value can be associated with each light projection. For example, an intensity map can be created to have half the resolution as the 3D printing system 100. In this example, each pixel value of the intensity can be set to represent a group of four light projections.

FIG. 3 is a flowchart of an example of a process 300 that validates an intensity map. The process 300 can be performed by, for example, computing devices, additive-manufacturing apparatuses, and/or human or robotic operators, e.g., calipers, micrometers, or custom-designed tools. The process 300 may be performed, for example, to determine if an intensity map properly accounts for variations in light projections for a particular 3D printing system.

Once an intensity map is created, it may be used when printing future objects so that the effects of the variations are reduced or eliminated. However, real-world constraints and imperfections in the additive-manufacturing apparatus may result in an intensity map that does not sufficiently reduce or eliminate the influence of the variations in light projection. To determine if the intensity map does reduce or eliminate the impact of the variations, a validation object can be printed with the intensity map applied. This validation object can then be tested to see if the measured heights of the validation object matches the nominal heights that would be expected. Depending on the results of this test, the intensity map may be designated as passing validation or failing validation. An intensity map that passes validation may be used in future builds with the additive-manufacturing apparatus. An intensity map that fails validation may be, for example, discarded and in some cases a new intensity map may be generated.

Pixel values of an intensity map are applied 302 to corresponding pixel values of an image of a calibration object to make a validation additive-manufacturing image. For example, the intensity map and the image of a calibration object may have the same resolution, and each pixel value having an X-location and a Y-location may be altered based on a pixel value of the intensity map having the same X-location and Y-location. The process for this alteration may depend on the format of the pixel values of the intensity map. In some examples, applying the pixel values of the intensity map can include adding a pixel value of the intensity map to a pixel value of the image of the calibration object. In some examples, pixel values of the image of the calibration object may be scaled by the pixel values of the intensity map, or a number derived therefrom.

For example, the intensity map may store a value of 0 to represent light projections that are of nominal intensity, with negative values indicating greater intensity and positive values indicating lesser intensity. To apply this intensity map to an image of a calibration object, the pixel values of the intensity map may be added to the pixel values of the image of a calibration object. In this example, the pixel values of the validation additive-manufacturing image are reduced where the 3D printing system 100 has light projections of greater-than-nominal intensity and pixel values of the validation additive-manufacturing image are increased where the 3D printing system 100 has light projections of less-than-nominal intensity.

A verification object is built 304 by the additive-manufacturing apparatus using the validating additive-manufacturing image. The validation object is measured to generate 306 height measures. For example, one or more operators may retrieve the validation object from the 3D printing system 100, clean the uncured resin from the validation object, and measure each of the measurement points of the validation object. The operators may be human, robotic, or a combination of both. The operator or operators may use general-purpose or custom tools to measure the height of each measurement point. In some examples, a general purpose micrometer may be used to measure a height of each measurement point. In some example, a custom measuring device may be used to measure a height of each measurement point. This custom measuring device may include, for example, a jig configured to hold the validation object and a bed of contact sensors that are each independently lowered toward the jig until contact is made with a measurement point.

The intensity map of the additive-manufacturing apparatus is validated 380 by determining that height measures of a validation object printed by the additive-manufacturing apparatus using the validating additive-manufacturing image are within a threshold range. For example, with the intensity map compensating for variations in light projection, the validation object can be expected to have a more uniform set of height measures. These height measures may be examined to determine if they all fall within a threshold window, within a threshold range of a target number, etc. In some examples, the validation object may be expected to have height measures of $Height_{nominal}$. The height measures may referred to as $Height_A$, $Height_B$, $Height_C$ .... Then, the validation object may validated, or not, based on the $Height_{nominal}$ and $Height_A$, $Height_B$, $Height_C$ .... In some examples, the intensity map may pass validation if no difference between $Height_{nominal}$ and $Height_A$, $Height_B$, $Height_C$ is greater than a threshold value and the intensity map may fail validation if any difference is greater than the threshold value. In some examples, the intensity map may pass validation if no pair of height measures are greater than a threshold value, and the intensity map can fail validation if any pair of height measures are greater than a threshold. Other verification tests are possible.

FIG. 4 is a flowchart of an example of a process 400 that builds an object using an intensity map. The process 400 can be performed by, for example, computing devices, additive-manufacturing apparatuses, and/or human or robotic operators using an additive-manufacturing apparatus such as the 3D printing system 100. For example, an operator may provide input to initiate the process 400.

The process 400 can be used to build an object with reduced or eliminated impact from variations of light intensity from the additive-manufacturing apparatus. In general terms, application of the intensity map can cause the additive-manufacturing apparatus to spend more time projecting light where light projections are weakest, and/or spend less time projecting light projections where light projections are strongest. This can result in a more even solidification of build media compared to builds without application of this kind of intensity map.

An intensity map is received 402. For example, the computer 150 can receive a data object that is or contains the intensity map. The computer 150 can store the intensity map in the memory 154 until it is later needed. In some examples, the computer 150 receives the intensity map because the computer 150 generates the intensity map. In some examples, the computer receives the intensity map as a result of the process 200, described above.

Cross-sectional images of a 3D model of an object is received 404. For example, the computer 150 can receive a data object that is or contains the cross-sectional images. The computer can store the cross-sectional images in the memory 154 until it is later needed. In some examples, the computer 150 receives the cross-sectional images because the computer 150 generates the cross-sectional images. As previously described, the 3D printing program 156 can convert mesh data that represents a digital model into a group of voxels. The computer 150 can treat each layer of these voxels as a group of 2D pixels to create the cross-sectional images of the 3D model of the object.

Each cross-sectional image has a plurality of pixel values, each pixel value of each cross-sectional image having an X-location and a Y-location. For example, the cross-sectional images may be stored as bitmap images, which store pixel values at X-locations and Y-locations.

A plurality of additive-manufacturing images are made 406. For example, the computer 150 can apply the intensity map to each of the cross-sectional images to make the additive-manufacturing images. In some examples, for each cross-sectional image of the 3D model, pixel values of the intensity map are applied to corresponding pixel values of the cross-sectional image of the 3D model having the same X-locations and Y-locations.

In some examples, applying the pixel values of the intensity map can include adding a pixel value of the intensity map to a pixel value of the cross-sectional image. In some examples, pixel values of the cross-sectional image may be scaled by the pixel values of the intensity map, or a number derived therefrom.

The additive-manufacturing images can be calibrated to account for the variations in intensity of the light projection. For example, the intensity map may store a value of 0 to represent light projections that are of nominal intensity, with negative values indicating greater intensity and positive values indicating lesser intensity. To apply this intensity map to a cross-sectional image, the pixel values of the intensity map may be added to the pixel values of the cross-sectional image. In this example, the pixel values of the additive-manufacturing images are reduced where the 3D printing system 100 has light projections of greater-than-nominal intensity and pixel values of the cross-sectional images are increased where the 3D printing system 100 has light projections of less-than-nominal intensity.

The additive-manufacturing images are provided 408 to the additive-manufacturing apparatus to build the object. For example, the computer 150 can pass the additive manufacturing images to the controller 145. The object can then be built 410 by the 3D printing system 100.

In some examples, the additive-manufacturing apparatus is a photo polymerization 3D printer, and the providing comprises directing the photo polymerization 3D printer to build the object by projecting the additive-manufacturing images into a resin. In some examples, the additive-manufacturing apparatus is a selective laser sintering 3D printer, and the providing comprises directing the selective laser sintering 3D printer to build the object by projecting the additive-manufacturing images into a metal powder.

Figure 5:
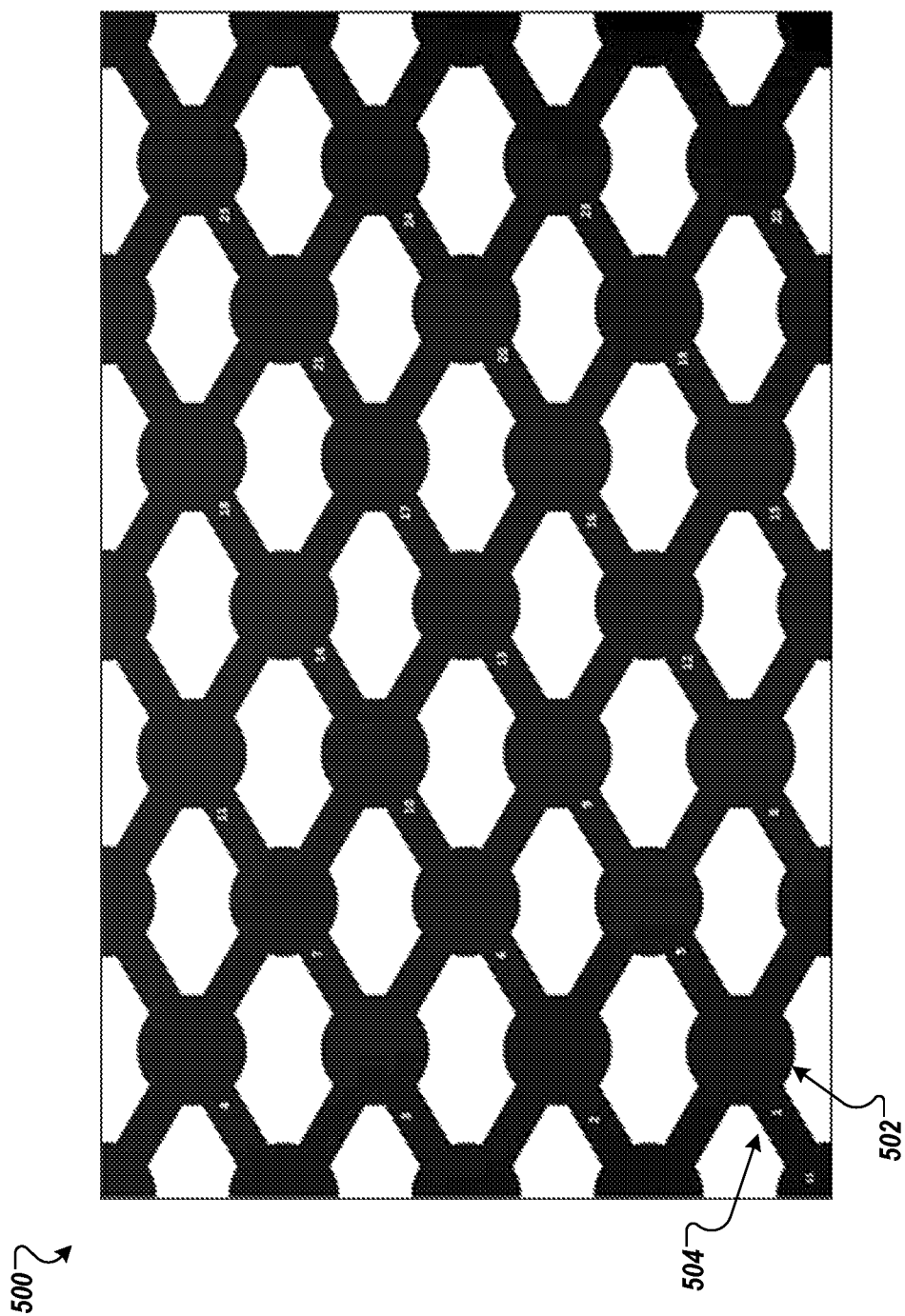
FIG. 5 is a top view of a calibration object.

FIG. 5 is a top view of a calibration object 500. The calibration object 500 may be printed, for example, by the 3D printing system 100 using the process 200 described above. This example calibration object 500 is designed as a lattice with circular nodes at the intersections. This design allows for a controlled number and placement of the nodes. If a larger or smaller calibration object is desired, for example, the lattice can be expanded so that it has more circular nodes or scaled so the number of circular nodes remains the same.

The calibration object 500 includes a plurality of measurement points 502. In the example shown, the circular nodes at intersections of a lattice are the measurement points 502. This configuration can allow a general-purpose micrometer to easily measure the height of each measurement point. In some examples, the measurement points each have a corresponding index 504. Shown here, the index 504 is a unique number printed near the measurement point. The index 504 may be useful, for example, to aid a human operator that is manually measuring and documenting height values.

Other shapes of calibration objects are possible. For example, a jig may be designed to hold a calibration object, and the calibration object may be configured to sit in the jig.

As previously described, pixel values of an intensity map can be generated for each light projection having the same X-location and Y-location by performing a regression analysis using the calibration measures as constraints. In general terms, this regression analysis can result in an estimated pixel value for each pixel of the intensity map based on a sparser map of values. This more-sparse map of values is provided from the calibrations measured from a calibration object. The calibration measures can be used as constraints in a regression analysis performed to find a mathematical surface that fits the constraints with acceptable error. An equation for this surface can then be used to find intensities for other locations.

Starting with the calibration measures, a dose of light energy for each calibration measure can be found. This calculation effectively finds the amount of light energy that has cured resin at a particular location. The thickness of cured resin can be related to the dose using the equation Thickness=a*ln (Dose/b), where a describes the penetration distance of light into the resin and b is the so called critical energy. These constants are constants based on properties of the resin as described in Jacobs *Rapid Prototyping & Manufacturing: Fundamentals of StereoLithography*, Society of Manufacturing Engineers, 1992. Other models, including more complicated models, may be used, for example if the resin displays photobleaching or other behavior. Generally, Thickness is a distance (e.g., microns) and Dose is calculated in energy per area (e.g., mJ/cm2).

From each Dose measure, % Dose can be found. The % Dose represents a value of a particular Dose relative to the average of all Dose values. The % Dose can be calculated by the equation % Dose=Dose/avg(all Dose values) for a calibration object. The % Dose may be stored in percentage format, in decimal format, or any appropriate format.

From the % Dose values, a regression analysis can be performed to find a regression equation that fits the % Dose constraints. This regression equation can later be used to find an estimated % Dose for any light projection, even if that light projection was not used in the creation of the calibration object (e.g., because it aligns with a gap in the lattice).

For example, a two dimensional linear regression via ordinary least squares may be used. This regression may consider parameters such as an intercept, the xlocation, the xlocation^2, and the ylocation. However, as is known, other parameters may be used in such regressions. The linear regression may be performed to find the value of the intercept ($\epsilon$) and coefficient values ($\beta_0$, $\beta_1$, $\beta_2$) for the xlocation, the xlocation^2, and the ylocation. From the intercept and coefficients, a regression equation that returns a % Dose value based on parameters xlocation and ylocation can be derived. For example, a two dimensional quadratic equation of % Dose=$\beta_0$*xlocation+$\beta_1$*xlocation^2+$\beta_2$*ylocation+$\epsilon$ may be used From the regression equation, pixel values of an intensity map can be calculated for each X-location and Y-location of the intensity map. For example, a computer application can iterate through the rows and columns of an intensity map with counters x and y. For each pixel [x][y], a pixel value can be found using the % Dose found by solving the regression equation using x for xlocation and y for ylocation. For example, for pixel[125][225], a % Dose can be calculated as $\beta_0$*xlocation+$\beta_1$*xlocation^=$\beta_2$*ylocation+$\epsilon$ or $\beta_0$*125+$\beta_1$*15625+$\beta_2$*225+$\epsilon$, or in this example 1.02. This % Dose indicates that the light projection at location [125][225] has an intensity of 102% of the average light intensity, or is 2% "too high".

With a calculated % Dose for each pixel value, a correctionFactor may be found that maps the % Dose values to a range that has a lower bound greater than or equal to 0 and an upper bound that is less than or equal to 1. In some instances, the range may have an upper bound of 0.99 and a lower bound selected based on the greatest % Dose calculated (e.g., lower bound=1−absoluteValue(1−% Dose)). Then, each correctionFactor can be found by dividing the lower bound by the % Dose. In this way, greater % Dose values (i.e., more intensity) result in lower correctionFactor values (i.e., greater down-tuning). Continuing with the example of the % Dose of 1.02, a lower bound of 0.094 may be used, resulting in a correctionFactor of 0.94/1.02, or 0.92.

The intensity map may then be found by multiplying the correctionFactor by the color value indicating maximum intensity in the printing system. For example, if a color value of 250 indicates maximum intensity, a pixel value for pixel[125][225] may be found as 250*correctionFactor or 250*0.92, or 230.

The intensity map can then be applied to a cross-sectional image to make an additive-manufacturing image that is calibrated to account for the variations in intensity of the light projection of the additive-manufacturing apparatus. For example, a computer application can iterate through the rows and columns of an empty additive-manufacturing image with counters x2 and y2. For each pixel[x2][y2], a pixel value can be found by decreasing the pixel value at pixel[x2][y2] in the cross-sectional image based on the corresponding pixel value in the pixel[x2][y2] in the intensity map. In doing so, light projections of the strongest intensity result in the greatest reduction to the additive-manufacturing image and light intensities of the weakest intensities result in least reductions.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by, and/or under the control of, one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other embodiments are within the scope of the following claims.

What is claimed is:

1. A method comprising:
    receiving, by a data processing apparatus comprising a memory, an intensity map comprising a plurality of pixel values, each pixel value of the intensity map having an X-location and a Y-location and representing intensity of light projection at the X-location and the Y-location by an additive-manufacturing apparatus, wherein the pixel values of the intensity map have been generated from measurements of heights of different parts of a calibration object previously printed by the additive-manufacturing apparatus;
    receiving, by the data processing apparatus comprising the memory, cross-sectional images of a three dimensional (3D) model of a manufacturable object, each of the cross-sectional images comprising a plurality of pixel values, and each of the pixel values of each of the cross-sectional images having an X-location and a Y-location;
    for each of the cross-sectional images of the 3D model, applying pixel values of the intensity map to corresponding pixel values of the cross-sectional image of the 3D model having the same X-locations and Y-locations, to make a corresponding one of a plurality of additive-manufacturing images that are calibrated to account for variations in intensity of the light projection; and
    providing the additive-manufacturing images to the additive-manufacturing apparatus to build the manufacturable object.

2. The method of claim 1, wherein the additive-manufacturing apparatus is a photo polymerization 3D printer, and the providing comprises directing the photo polymerization 3D printer to build the manufacturable object by projecting the additive-manufacturing images into a resin.

3. The method of claim 2, wherein:
    each of the pixel values of the intensity map represents an intensity of a corresponding X-location and Y-location of the light projection.

4. The method of claim 1, comprising:
    receiving, by the data processing apparatus comprising the memory, the measurements of height, each of the measurements of height having an X-location and a Y-location, wherein the measurements of height are fewer in number than there are light projections by the additive manufacturing apparatus for the printing of the calibration object; and
    generating the pixel values of the intensity map by performing a regression analysis using the measurements of height as constraints.

5. The method of claim 4, comprising:
    receiving the calibration object previously printed by the additive-manufacturing apparatus, the calibration object comprising a plurality of measurement points; and
    measuring each of the measurement points to generate the measurements of height.

6. The method of claim 5, comprising:
    printing, by the additive-manufacturing apparatus, the calibration object, wherein variations in intensity of the light projections of the additive-manufacturing apparatus for printing the calibration object cause the measurement points of the calibration object to have variations in height.

7. The method of claim 6, comprising:
    applying pixel values of the intensity map to corresponding pixel values of an image of the calibration object to make a validation additive-manufacturing image; and
    validating the intensity map of the additive-manufacturing apparatus by determining that validation measures of a validation object printed by the additive-manufacturing apparatus using the validation additive-manufacturing image are within a threshold range.

8. The method of claim 7, comprising printing, by the additive-manufacturing apparatus, the validation object using the validation additive-manufacturing image.

9. The method of claim 8, comprising measuring the printed validation object to generate the validation measures.

10. A system for printing an object, the system comprising:
    an additive-manufacturing apparatus configured to:
        build an object by selectively projecting light to successive layers of a build media; and
    a data processor configured to:
        receive an intensity map comprising a plurality of pixel values, each pixel value of the intensity map having an X-location and a Y-location and representing intensity of light projection at the X-location and the Y-location by the additive-manufacturing apparatus, wherein the pixel values of the intensity map have been generated from measurements of heights of different parts of a calibration object previously printed by the additive-manufacturing apparatus;
        receive cross-sectional images of a three dimensional (3D) model of a manufacturable object, each of the cross-sectional images comprising a plurality of pixel values, and each of the pixel values of each of the cross-sectional images having an X-location and a Y-location;
        for each of the cross-sectional images of the 3D model, apply pixel values of the intensity map to corresponding pixel values of the cross-sectional image of the 3D model having the same X-locations and Y-locations, to make a corresponding one of a plurality of additive-manufacturing images that are calibrated to account for variations in intensity of the light projection; and
        provide the additive-manufacturing images to the additive-manufacturing apparatus to build the manufacturable object.

11. The system of claim 10, wherein the additive-manufacturing apparatus and the data processor are integrated into a single device.

12. The system of claim 10, wherein the additive-manufacturing apparatus is a photo polymerization 3D printer.

13. The system of claim 10, wherein:
each of the pixel values of the intensity map are proportional to an intensity of a corresponding X-location and Y-location of the light projection.

14. The system of claim 10, wherein the data processor is configured to:
receive the measurements of height, each of the measurements of height having an X-location and a Y-location wherein the measurements of height are fewer in number than there are light projections by the additive manufacturing apparatus for the printing of the calibration object; and
generate the pixel values of the intensity map by performing a regression analysis using the measurements of height as constraints.

15. The system of claim 14, wherein the data processor is configured to:
generate the measurements of height.

16. The system of claim 15, wherein the additive-manufacturing apparatus is configured to:
print the calibration object, wherein variations in intensity of the light projections of the additive-manufacturing apparatus for printing the calibration object cause measurement points of the calibration object to have variations in height.

17. The system of claim 16, wherein the data processor is configured to:
apply pixel values of the intensity map to corresponding pixel values of an image of the calibration object to make a validation additive-manufacturing image; and
validate the intensity map of the additive-manufacturing apparatus by determining that validation measures of a validation object printed by the additive-manufacturing apparatus using the validation additive-manufacturing image are within a threshold range.

18. The system of claim 17, wherein the additive-manufacturing apparatus is configured to:
print the validation object using the validation additive-manufacturing image.

19. The system of claim 18, wherein the data processor is configured to:
receive an indication of validation based on measures of the validation object.

* * * * *